United States Patent
Nagano et al.

(10) Patent No.: US 7,483,341 B2
(45) Date of Patent: Jan. 27, 2009

(54) OPTICAL DISK APPARATUS CAPABLE OF RECORDING BROADCAST PROGRAM WITH VISIBLE SYMBOL

(75) Inventors: Takashi Nagano, Hamamatsu (JP); Morito Morishima, Fukuroi (JP)

(73) Assignee: Yamaha Corporation, Hamamatsu-Shi (JP)

( * ) Notice: Subject to any disclaimer, the term of this patent is extended or adjusted under 35 U.S.C. 154(b) by 628 days.

(21) Appl. No.: 11/014,265

(22) Filed: Dec. 15, 2004

(65) Prior Publication Data
US 2005/0169115 A1 Aug. 4, 2005

(30) Foreign Application Priority Data
Dec. 16, 2003 (JP) .............................. 2003-417988

(51) Int. Cl.
H04H 9/00 (2006.01)
G11B 3/64 (2006.01)
(52) U.S. Cl. .................................. 369/7; 369/84; 347/2
(58) Field of Classification Search .................. 369/84, 369/85, 7; 386/46, 65, 83, 95, 77; 347/2, 347/4; 101/38.1; 400/70, 73, 56, 384
See application file for complete search history.

(56) References Cited

U.S. PATENT DOCUMENTS

| | | | |
|---|---|---|---|
| 4,814,594 A | 3/1989 | Drexler | |
| 5,518,325 A | 5/1996 | Kahle | |
| 6,074,031 A | 6/2000 | Kahle | |
| 6,270,176 B1 | 8/2001 | Kahle | |
| 2001/0026531 A1 | 10/2001 | Onodera et al. | |
| 2001/0040867 A1 | 11/2001 | Onodera et al. | |

FOREIGN PATENT DOCUMENTS

| JP | 11-213455 | 8/1999 |
|---|---|---|
| JP | 2003-338166 | 11/2003 |

*Primary Examiner*—Ali Neyzari
(74) *Attorney, Agent, or Firm*—Morrison & Foerster LLP

(57) ABSTRACT

In an apparatus for recording a broadcast program on an optical disk, a broadcast reception section receives a broadcast signal containing various programs broadcasted from a broadcast station. A recording setup section specifies a program to be recorded on an optical disk among the various programs contained in the received broadcast signal. An information acquisition section acquires attribute information associative of content of the specified program from an electronic program guide of various programs. A recording/reproducing section is operated to record the content of the specified program by forming a pattern of marks and spaces on a data recording face of the optical disk with an optical process of irradiating an optical beam onto the data recording face, and is also operated to form a visible image of the attribute information of the recorded content with the optical process on other area of the data recording face than the area where the content is recorded or on a label face reverse to the data recording face of the optical disk.

7 Claims, 6 Drawing Sheets

OPTICAL DISK APPARATUS CAPABLE OF RECORDING BROADCAST PROGRAM WITH VISIBLE SYMBOL

BACKGROUND OF THE INFORMATION

1. Technical Field

The present invention relates to an optical disk recording apparatus which allows an optical disk to visualize content information about a program recorded on the optical disk.

2. Related Art

Recently, there are spreading DVD (Digital Versatile Disk) recorders and those equipped with HDDs (Hard Disk Drives). Like video recorders, the DVD recorder generally includes a television broadcast receiver. A user can schedule cording of programs by checking a TV programs schedule on newspapers and the like or an Electronic Program Guide (EPG) delivered with the broadcast wave on a monitor.

Let us suppose that a user uses the DVD recorder to record a program on DVD or to dub a program recorded on HDD to the DVD. He or she needs to make notes of a title and contents of the recorded program on the DVD's label face so as to identify the program recorded on the DVD. Otherwise, the program can be identified only when the DVD is reproduced. It is time-consuming to search for a DVD that records the intended program.

To solve this problem, there is disclosed a conventional technology concerning: a center apparatus to broadcast the audiovisual information representing contents of a program and the program information including its label information; and a terminal apparatus to record the audiovisual information and program information about the received program on recording media and to print the label information contained in the program information on a label. Such a technology is disclosed for example a patent document of in Japanese Non-examined Patent Publication No. 2003-46922 (pp. 2 through 8, FIGS. 1 through 16)

In the digital broadcast system, broadcast stations deliver the electronic program guide by the broadcast waves. In the analog broadcast system, on the other hand, most broadcast stations, with some exceptions, do not deliver the electronic program guide by broadcast waves. Depending on cases, the terminal apparatus disclosed in the patent document cannot acquire the label information contained in the program information nor create labels to be attached to recording media.

Even if the terminal apparatus described in the patent document can create labels for recording media, a user may forget to attach the label on the recording medium or may lose the label. In such case, the recording content can be recognized only when the recording medium is reproduced. Further, attaching a label may unbalance the weight of an optical disk, causing it to vibrate during revolution. This phenomenon becomes more remarkable as a label becomes larger and heavier and is attached to a position nearer to the outside periphery of the optical disk. The vibration amount increases quadrically as the optical disk's rotation speed increases. If the labeled optical disk has an improper weight balance and is fast rotated for reading and writing, the optical disk or its drive may be damaged in the worst case.

Aging due to heat and light weakens the label's adhesive force. The label may peel off the optical disk. If the label peels off the optical disk mounted on the drive, the label may contact with movable parts of the disk drive or be caught therein, marring the optical disk or damaging the disk drive.

SUMMARY OF THE INVENTION

It is therefore an object of the present invention to provide an optical recording apparatus capable of safe reproduction operation even if an optical disk is provided with visualized content information such as a title in addition to contents of a program audiovisually recorded on the optical disk.

The present invention has the following constructions as means for solving the above-mentioned problems.

An inventive apparatus is constructed for recording a broadcast program on an optical disk. The inventive apparatus comprises a broadcast reception section that receives a broadcast signal containing programs broadcasted from a broadcast station, a recording setup section that specifies a program to be recorded on an optical disk and contained in the received broadcast signal, an information acquisition section that acquires attribute associated with and serving to identify content of the specified program from an electronic program guide of the programs, the electronic program guide being contained in the broadcast signal or being available from another source separate of the broadcast signal, and a recording/reproducing section that is operated to record the content of the specified program by forming a pattern of marks and spaces on a data recording face of the optical disk with an optical process of irradiating an optical beam onto the data recording face, and that is operated to form a visible image of the attribute information of the recorded content with the optical process on other area of the data recording face than the area where the content is recorded or on a label face to the data recording face of the optical disk.

This construction not only generates the mark and the space on the optical disk by the optical process so as to record the content of the program, but also utilizes this optical process to generate the visible image or symbol indicating the content of the program recorded on the optical disk. In detail, the optical disk recording apparatus generates the visible image indicating the attribute information of the content of the program recorded on the optical disk by acquiring an electronic program guide transmitted with the broadcast signal or provided from another source such as a broadcast information service site on Internet. Hereafter, the attribute information associated with and serving to identify the content of the program may be simply referred to as "content information". Such content information is available from various information sources such as Internet even when the broadcast station transmits the broadcast signal only containing the contents of the programs. The inventive recording apparatus can be configured to record the content of the program on the optical disk and to generate the visible image of symbol indicating the attribute information of the recorded program content. Consequently, it is possible to easily determine which program is recorded on the optical disk even after the optical disk is taken out of the recording apparatus once the program has been recorded and the visible image generation has been finished.

Preferably, the attribute information of the content of the program may be provided in the form of character information or image information. The character information includes the program title, broadcast date, program start time, program end time, summary of the content (digest), and genre. The image information includes the program logo, thumbnails to show some scenes of the program.

The inventive apparatus may further comprises a storage section that stores the attribute information acquired by the information acquisition section. In such a case, the recording/reproducing section records the content of the specified program, then reads the attribute information of the recorded content from the storage section, and forms the visible image of the read attribute information on the data recording face of the optical disk or the label face reverse to the data recording face.

According to this construction, the inventive disk recording apparatus is equipped with the storage section to store the program guide information even if the program guide information may be recorded on the optical disk during the course of recording of the content of the program. Accordingly, the program guide information can be read from the storage section immediately after the content of the program is recorded on the optical disk so as to generate the visible image indicating the attribute information of the content of the program recorded on the optical disk. After the program content is recorded on the optical disk, this optical disk may be temporarily taken out of the recording apparatus. When the optical disk is again loaded into the optical recording apparatus, it is possible to form the visible image indicating the attribute information about the program content recorded on the optical disk.

Preferably, when the inventive recording apparatus is mounted with an optical disk that is recorded with the content of the program and the electronic program guide, the information acquisition section operates the reproducing/recording section to reproduce the electronic program guide from the mounted optical disk and acquires the attribute information of the content of the program recorded on the optical disk from the electronic program guide reproduced by the recording/reproducing section. The recording/reproducing section forms the visible image indicating the attribute information of the program recorded on the optical disk based on the attribute information acquired by the information acquisition section.

According to this construction, when the recording apparatus is mounted with an optical disk that records program content and an electronic program guide containing the attribute information, the recording apparatus can acquire the attribute information of the program content recorded on the optical disk and generate the visible image indicating the attribute information on the optical disk's data recording face. When the attribute information of the program content has been recorded on the optical disk even by means of another optical disk recording apparatus, it is possible to generate the visible image indicating the attribute information about of the program content recorded on the optical disk.

The optical recording apparatus according to the present invention can acquire the attribute information of the program content irrespectively of the analog or digital broadcast system. The optical recording apparatus can select specified items of the attribute information of the program content and record the selected attribute item in the from of either character information or image information by radiating the optical beam such as laser light on an optical disk's recording face. When recording the program content on the optical disk by the optical process, the optical recording apparatus performs the same optical process as the content data recording to form the visible image indicating the attribute information of the program content on the optical disk. It is possible to prevent problems such as weight unbalancing of a labeled optical disk and peeling off of the label. Users can easily identify the content of the program recorded on the optical disk without reproducing the optical disk.

DETAILED DESCRIPTION OF THE INVENTION

Figure 1:
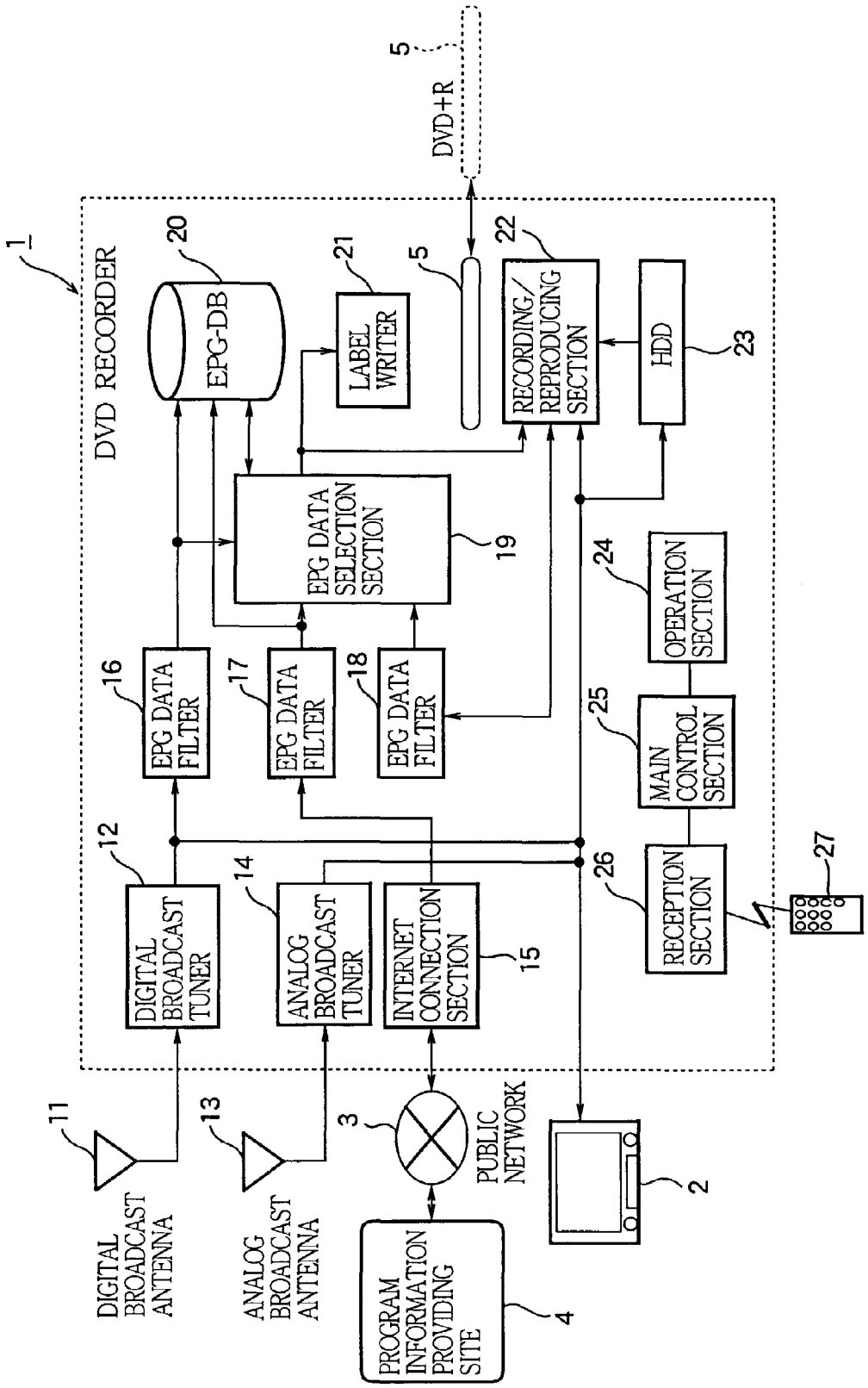
FIG. 1 is a block diagram schematically showing the configuration of the optical disk recording apparatus according to the embodiment of the present invention.

FIG. 1 is a block diagram showing the schematic configuration of an optical disk recording apparatus according to an embodiment of the present invention. The present invention has a recording/reproducing section that audiovisually records radio and television programs on recordable optical disks. The following description uses DVD+R as an example of recordable optical disks. A DVD recorder 1 functions as the optical disk recording apparatus and receives broadcast signals transmitted from a broadcast station (not shown). The DVD recorder 1 outputs broadcast signals to a monitor 2 and records broadcast signals on the DVD+R 5. When the DVD recorder 1 outputs broadcast signals, the monitor 2 audiovisually outputs programs and displays the EPG in accordance with user operations.

The DVD recorder 1 comprises: a digital broadcast tuner 12 connecting with a digital broadcast antenna 11; a analog broadcast tuner 14 connecting with an analog broadcast antenna 13; an Internet connection section 15 connected to a public network 3; an EPG data filter 16; an EPG data filter 17; an EPG data filter 18; an EPG data selection section 19; an EPG database 20; a label writer 21; a recording/reproducing section 22; an HDD 23; an operation section 24; a main control section 25; a reception section 26; and a remote controller 27.

The digital broadcast antenna 11 receives digital broadcast waves transmitted from a broadcast station. The digital broadcast tuner 12 selects broadcast signals for a specific channel from broadcast signals received by the digital broadcast antenna 11. The digital broadcast tuner 12 outputs audiovisual signals for programs broadcast at this channel and a signal for the EPG data.

The analog broadcast antenna 13 receives analog broadcast waves transmitted from the broadcast station. The analog broadcast tuner 14 selects broadcast signals for a specific channel from broadcast signals received by the analog broadcast antenna 13. The analog broadcast tuner 14 outputs audiovisual signals for programs broadcast at this channel and a signal for the EPG data if contained in the broadcast signals.

The broadcast station provides an electronic program guide organized as content information about programs scheduled to be broadcast for a week from the present time, for example, and delivers the electronic program guide as EPG data included in broadcast signals. The broadcast station also delivers character information and image information as the content information about each program. The character information includes the program title, broadcast date, program start time, program end time, summary of the content (digest), and genre. The image information includes the program logo, thumbnails to show some scenes of the program. In short, the content information is a kind of attribute information associated with and serving to identify the content of the program.

The public network 3 is a communication line network (Internet) for connection with a plurality of devices such as sites (servers) to provide various information and computers to receive information from these sites. The public network 3 connects with a program information providing site 4 that provides content information about analog broadcast programs.

The Internet connection section 15 connects to the program information providing site 4 via the public network 3 and acquires the electronic program guide from this site. No EPG data may be contained in a specific channel's broadcast wave received by the analog broadcast tuner 14. In such case, the Internet connection section 15 acquires the content information about programs broadcast by this channel from the program information providing site 4.

The EPG data filter 16 extracts only signals for the EPG data from video signals, audio signals, and signals for the EPG data output from the digital broadcast tuner 12. The EPG data filter 16 then outputs the extracted signals to the EPG data selection section 19 and the EPG database 20.

The EPG data filter 17 extracts the EPG data from the information the Internet connection section 15 receives from the program information providing site 4. The EPG data filter 17 then outputs the extracted EPG data to the EPG data selection section 19 and the EPG database 20.

The EPG data filter 18 extracts the EPG data from record data the recording/reproducing section 22 reads from the DVD+R 5. The EPG data filter 18 then outputs the extracted EPG data to the EPG data selection section 19.

The EPG data selection section 19 selects the EPG data containing the content information about programs to be or already stored on the DVD+R 5 from EPG data output from the EPG data filter 16, the EPG data filter 17, the EPG data filter 18, or the EPG database 20. The EPG data selection section 19 then outputs the selected EPG data to the label writer 21 and the recording/reproducing section 22. The EPG data selection section 19 extracts only the user-specified content information from the content information about the selected programs. When a user specifies extracting only program titles and broadcast dates from the content information about programs, for example, the EPG data selection section 19 extracts only these types of content information.

The EPG database 20 stores EPG data output from the EPG data filter 16, the EPG data filter 17, or the EPG data selection section 19.

When the DVD+R 5 records programs, the label writer 21 prints the content information about the programs on the label face of the DVD+R 5. The label writer 21 may be preferably implemented as a thermoelectric printer or an inkjet printer, for example. The DVD+R 5 may be often coated with such material as a pigment that develops color when the laser light is radiated to the label face. In this case, the label writer 21 replaced by the same configuration as the recording/reproducing section 22 to be described later. Further, it may be preferable to use the DVD+R 5 whose label face is coated with such material as a thermal pigment. In this case, data can be recorded on the data recording face of the DVD+R 5 if reversely mounted. At least one of the label face and the data recording face can record the content information about programs recorded on the DVD+R 5. The DVD recorder may not have the label writer 21. In this case, as will be described later, the recording/reproducing section 22 can form a visible image on the data recording face of the DVD+R 5 so as to display the program's content information. It is possible to prevent problems such as weight unbalancing of a labeled optical disk and peeling off of the label.

When the digital broadcast tuner 12 and the analog broadcast tuner 14 receive channel's audiovisual signals, the recording/reproducing section 22 records these signals on the DVD+R 5 mounted on the recording/reproducing section 22. When the EPG data selection section 19 outputs the EPG data, the recording/reproducing section 22 converts this EPG data into visible image data. The recording/reproducing section 22 radiates the laser light to an unused area on the recording side of the DVD+R 5 to generate a visible image representing the content information about programs recorded on the DVD+R 5. The configuration and operations of the recording/reproducing section 22 will be described in detail later.

When the digital broadcast tuner 12 and the analog broadcast tuner 14 receive channel's audiovisual signals, the HDD 23 records these signals on a built-in hard disk. The HDD 23 outputs program's audiovisual signals (hereafter referred to as program data) recorded on the hard disk to the recording/reproducing section 22, making it possible to dub (or move) programs recorded on the HDD 23 to the DVD+R 5.

The operation section 24 accepts user operations performed to schedule recording or record a visible image.

The main control section 25 controls components of the DVD recorder 1. The main control section 25 provides control to schedule recording or record a visible image in accordance with operations performed on the operation section 24 and the remote controller 27. The main control section 25 operating and controlling the DVD recorder 1.

The reception section 26 receives signals output from the remote controller 27 in accordance with user operations.

The remote controller 27 accepts user operations on the DVD recorder 1 to schedule recording or record a visible image and outputs signals corresponding to the operations.

Figure 2:
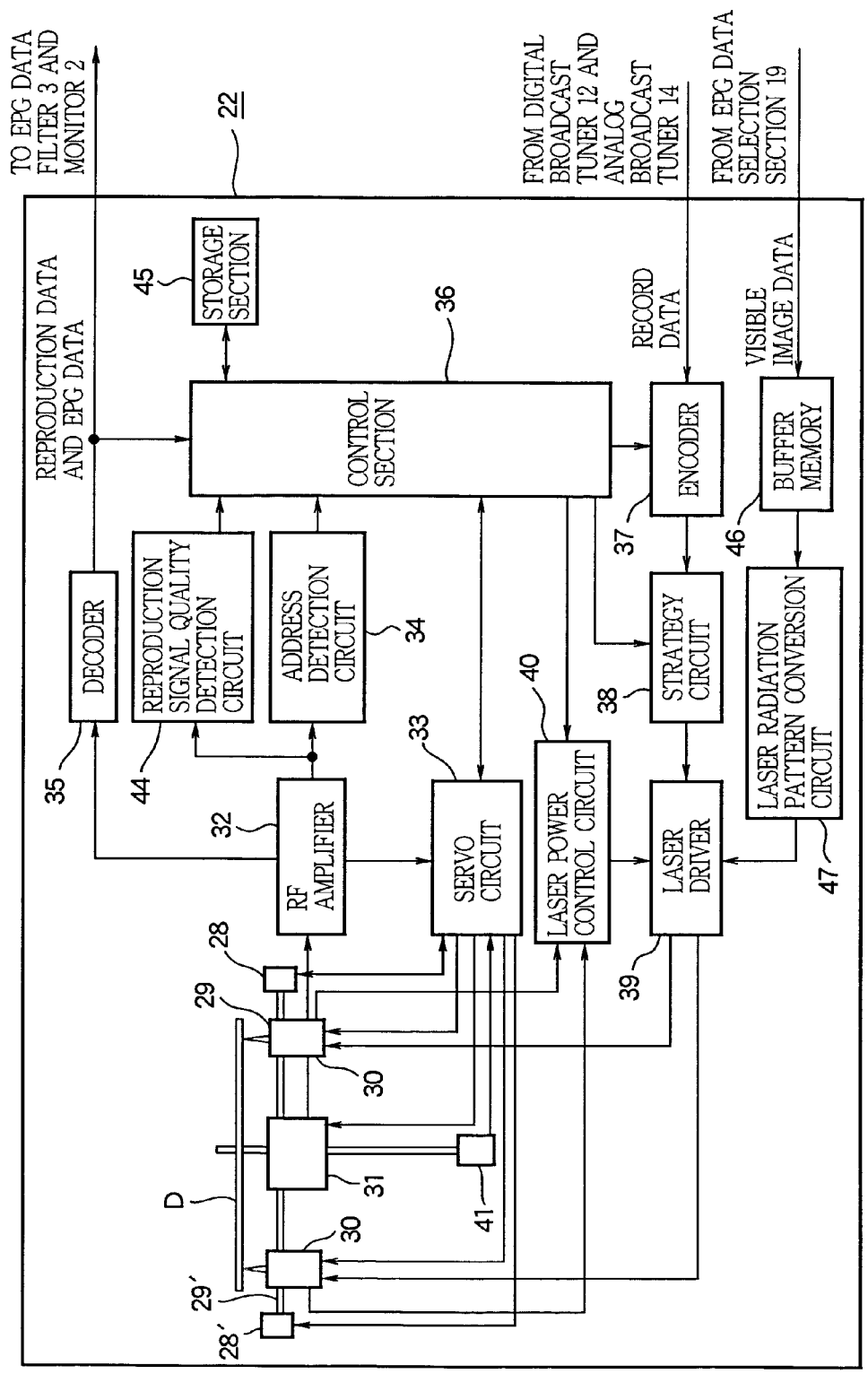
FIG. 2 is a block diagram schematically showing a recording/reproducing section of the inventive optical disk recording apparatus.

The following describes the specific configuration of the recording/reproducing section 22 with reference to FIG. 2. FIG. 2 is a block diagram schematically showing the configuration of the recording/reproducing section. The recording/reproducing section 22 comprises a feed motor 28, a guide rail 29, an optical pickup 30, a spindle motor 31, an RF amplifier 32, a servo circuit 33, an address detection circuit 34, a decoder 35, a control section 36, an encoder 37, a strategy circuit 38, a laser driver 39, a laser power circuit 40, a frequency generator 41, a reproduction signal quality detection circuit 44, a storage section 45, buffer memory 46, and a laser radiation pattern conversion circuit 47.

The feed motor 28 supplies a drive force to move the optical pickup 30 along the radial direction of the optical disk. The guide rail 29 supports the optical pickup 30 so that the optical pickup can move along the radial direction of the optical disk.

The optical pickup 30 comprises, though not shown, an optical system composed of a laser diode, a lens, a mirror, and the like, a return light (reflected light) receiving element, servo mechanisms such as a focus servo, a tracking servo, and a tilt servo. When recording and reproducing data, the optical pickup 30 radiates the laser light to the DVD+R 5, receives the return light from the DVD+R 5, and outputs a light-reception signal to the RF amplifier 32. The light-reception signal is an RF signal processed by the 8/16 modulation (EFMplus). The optical pickup 30 has a monitor diode. The return light from the DVD+R 5 generates an electric current in the monitor diode. This current is supplied to the laser power control circuit 40. It may be preferable to provide two optical pickups 30 and 30' movable along the radial direction of the DVD+R 5: one for recording program data and the other for generating visible images for displaying the content information about the program. In this case, visible images can be generated in an area near the outside periphery of the DVD+R 5 immediately after the data recording starts.

The spindle motor 31 rotatively drives the DVD+R 5 as a medium to record data. The spindle motor 31 is provided with an optical disk chucking mechanism (not shown) comprising a turntable and the like for chucking optical disks at the tip end of a rotating shaft. When the spindle motor 31 outputs a relative position signal for the DVD+R 5, the frequency generator 41 detects this signal and outputs signals for detecting rotation angles and speeds of the DVD+R 5 to the servo circuit 33.

The RF amplifier 32 amplifies the 8/16-modulated RF signal output from the optical pickup 30 and outputs the amplified RF signal to the servo circuit 33, the address detection circuit 34, the reproduction signal quality detection circuit 44, and the decoder 35.

The servo circuit 33 provides the spindle motor 31 with rotation control, the optical pickup 30 with focus control, tracking control, and tilt control, and the feed motor 28 with feed control over the optical pickup 30.

The address detection circuit 34 extracts wobble signal components from the RF signal supplied from the RF amplifier 32, decodes various information such as time information (address information) contained in signal components, and outputs the information to the control section 36.

While reproducing a test recording area on the DVD+R 5, the reproduction signal quality detection circuit 44 calculates β and γ as parameters concerning the reproduction signal quality from the RF signal supplied from the RF amplifier 32 and outputs a calculation result to the control section 36.

The decoder 35 8/16-demodulates the 8/16-modulated RF signal supplied from the RF amplifier 32 to generate reproduction data and outputs the data to the monitor 2, the EPG data filter 18, and the control section 36.

The encoder 37 8/16-modulates record data output from the digital broadcast tuner 12 or the analog broadcast tuner 14 and random pattern data output from the control section 36 and outputs the modulated data to the strategy circuit 38.

The strategy circuit 38 applies a time axis correction process to the RF signal output from the encoder 37 and outputs the data to the laser driver 39.

The laser driver 39 drives the laser diode of the optical pickup 30 in accordance with: the signal modulated according to the record data supplied from the strategy circuit 38; and the control signal from the laser power control circuit 40.

The laser power control circuit 40 controls power of the laser light radiated from the laser diode of the optical pickup 30. Specifically, the laser power control circuit 40 controls the laser driver 39 based on an electric current value output from the monitor diode of the optical pickup 30 and on the information indicating a target value for optimum laser power transmitted from the control section 36 so that the optical pickup 30 can radiate the laser light with optimum laser power.

The control section 36 comprises a CPU, ROM, and RAM (not shown), and controls components of the recording/reproducing section 22 in accordance with a software program stored in the ROM.

The control section 45 stores data previously obtained through experiments and the like, firmware for the recording/reproducing section 22, and the like.

The buffer memory 46 temporarily stores visible image generation data transferred from the EPG data selection section 19 and outputs the data to the laser radiation pattern conversion circuit 47. The laser radiation pattern conversion circuit 47 converts the visible image generation data into a laser radiation pattern and outputs it to the laser driver 19.

The following describes the principle of the DVD recorder 1 to generate visible images. Let us consider that the laser light is radiated to a recordable optical disk to generate a mark for recording data. Light reflectances of light result from a portion where the laser light is radiated to form the mark and a portion where no laser light is radiated to leave a space, causing color shades on the data recording face. Using this characteristic, the DVD recorder 1 can radiate the laser light to the data recording face of the recordable optical disk and form visually recognizable images (hereafter referred to as visible images) such as characters, symbols, pictures, and photos having intended shapes. The information about record data can be displayed as visible images such as characters and graphics on the data recording face of the recordable optical disk. The user need not manually write or print the information about record data on the label face of the optical disk and can easily identify the optical disk's recording content.

Figure 3:
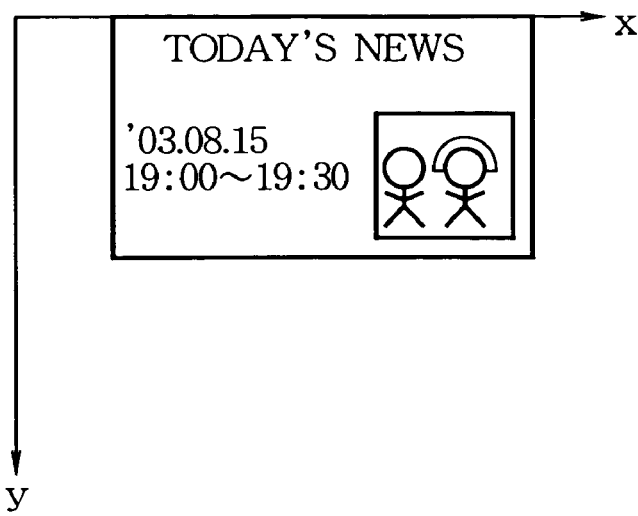
FIGS. 3(A) and (B) are diagrams showing a visual image formed according to the rectangular coordinate system and the polar coordinate system, respectively.
Figure 3:
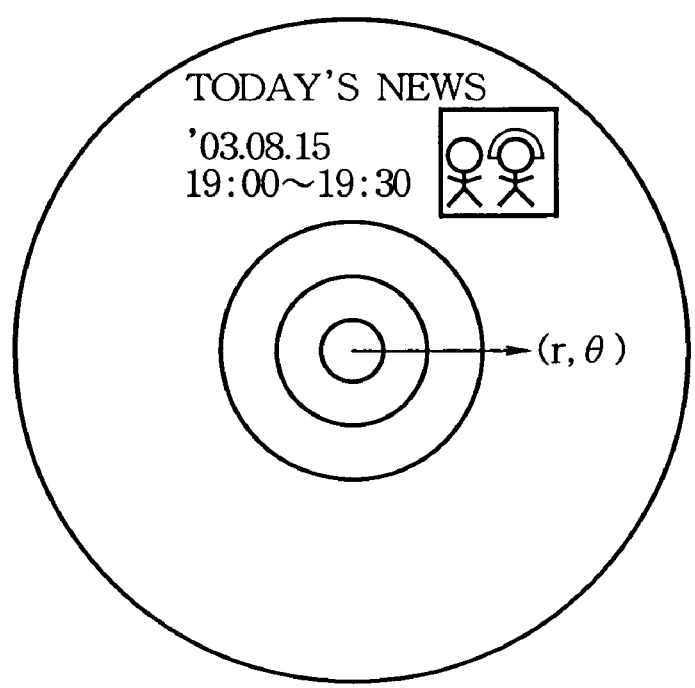

FIG. 3 shows an image according to the rectangular coordinate system and an image according to the polar coordinate system. Simultaneously with data recording, the DVD recorder 1 radiates the laser light to generate an visible image by rotating the DVD+R 5. An image according to the polar coordinate system is used as a basis for creating a laser light radiation pattern for the visible image generated on the optical disk. On the other hand, the EPG data is composed of text data or image data that belong to data according to the rectangular coordinate system. For this reason, the DVD recorder 1 converts image data and text data according to the rectangular coordinate system into image data according to the polar coordinate system. The DVD recorder 1 creates the visible image generation information based on the image data according to the polar coordinate system and records a visible image on the optical disk according to the visible image generation information. That is to say, the DVD recorder 1 converts image data according to the rectangular coordinate system in FIG. 3(A) into image data according to the polar coordinate system in FIG. 3(B). The DVD recorder 1 forms a mark and a space to record the visible image on the optical disk.

The DVD recorder 1 acquires the content information about the program recorded on the DVD+R 5 from the EPG data and the recorded program data. For example, the content information includes the program's title, logo, broadcast date, program start time, program end time, summary of the content (digest), genre, and thumbnail. The DVD recorder 1 converts the content information into image data and can record it as a visible image on the data recording face's unused area of the DVD+R 5. In addition, a user can operate the operation section 24 or the remote controller 27 to preset the DVD recorder 1 so as to display items to be displayed as visible images. The DVD recorder 1 can extract only the preset items from the EPG data to generate a visible image. For example, the DVD recorder 1 can be configured to record only the program title and the recording date as visible images. Further, the DVD recorder 1 can extract one or more images from the image data for the program recorded on the DVD+R 5 and display the images as visible images on the data recording face of the DVD+R 5.

The DVD recorder 1 can generate the visible image on the DVD+R 5 at the following timings.

1. The DVD recorder 1 can simultaneously record a program and a visible image on the DVD+R 5.

When the DVD recorder 1 has the CM cut function with the optical pickup 30 comprising one laser diode, the DVD recorder 1 can be configured to record program data on the DVD+R 5 during program recording and record the visible image indicating the content information about the program on the DVD+R 5 during the broadcast of commercial messages. In this case, the information amount of program data can be obtained from the content information beforehand. Consequently, the DVD recorder 1 calculates in advance the end of the data recording area before recording the program and generates a visible image on the unused area when the commercial begins.

The DVD recorder 1 may be configured to have two optical pickups 30. While one optical pickup records the broadcast on the DVD+R 5, the other optical pickup can generate a visible image indicating the content information about the program in the unused area of the DVD+R 5. Also in this case, the DVD recorder 1 acquires the information amount of program data in advance to calculate the end of the data recording area before recording the program and generates a visible image on the unused area.

2. The DVD recorder 1 can successively record a visible image immediately after completion of recording program data on the DVD.

For example, the DVD recorder 1 may use the optical pickup 30 comprising one laser diode and disable the CM cut function or may not have this function. In such case, the DVD recorder 1 records program data on the DVD+R 5 while recording the program and the commercial. When the program ends to complete the recording, the DVD recorder 1 can generate a visible image indicating the content information about the program on the DVD+R 5.

3. After the DVD recorder 1 records program data on the DVD+R 5, it may be removed 5 from the DVD recorder 1. When the DVD+R 5 is mounted again on the DVD recorder 1, it can generate the content information about the program recorded on the DVD+R 5.

The user may configure the DVD recorder 1 to record program data without generating a visible image indicating the content information. In such case, the DVD recorder 1 can be preset to collect the content information about programs including a program to be recorded on the DVD+R 5 and the other information such as a serial number of the DVD+R 5 and to store the collected information in the EPG database 20. When the user configures the DVD recorder 1 to record program data without generating a visible image, the DVD recorder 1 can be preset to record not only the program data, but also the content information about the program to be recorded together. There may be a case of failing to form a visible image indicating the content information about the program recorded on the DVD+R 5 for some reason. This can be solved by re-mounting the DVD+R 5 on the DVD recorder 1 after completion of the program data recording. The visible image displaying the content information can be generated based on the content information about the program recorded in the EPG database 20 or the DVD+R 5. Further, the DVD recorder 1 may read the content information about the program from the EPG database 20 to generate the visible image. In this case, the DVD recorder 1 selects the program's content information by reading such information as the file information, recording date information (timestamp), and serial number of the program data recorded on the DVD+R 5. The DVD recorder 1 allows the monitor 2 to display indications that allow a user to select or confirm the content information. The DVD recorder 1 generates a visible image on the unused area in response to an instruction from the operation section 24 or the remote controller 27 to record the program's content information.

Operations of the DVD recorder 1 will be described with reference to a flowchart. The DVD recorder 1 allows selection between two modes of recording reservation: a manual reservation mode and an EPG reservation mode. In the manual reservation mode, the user can reserve programs by referring to TV programs schedules on newspapers and the like. In the EPG reservation mode, the monitor 2 displays the EPG that helps the user to reserve programs. As mentioned above, the DVD recorder 1 can generate visible images on the DVD+R 5 at three timings. The following describes operations of the DVD recorder 1 in each of these cases.

Figure 4:
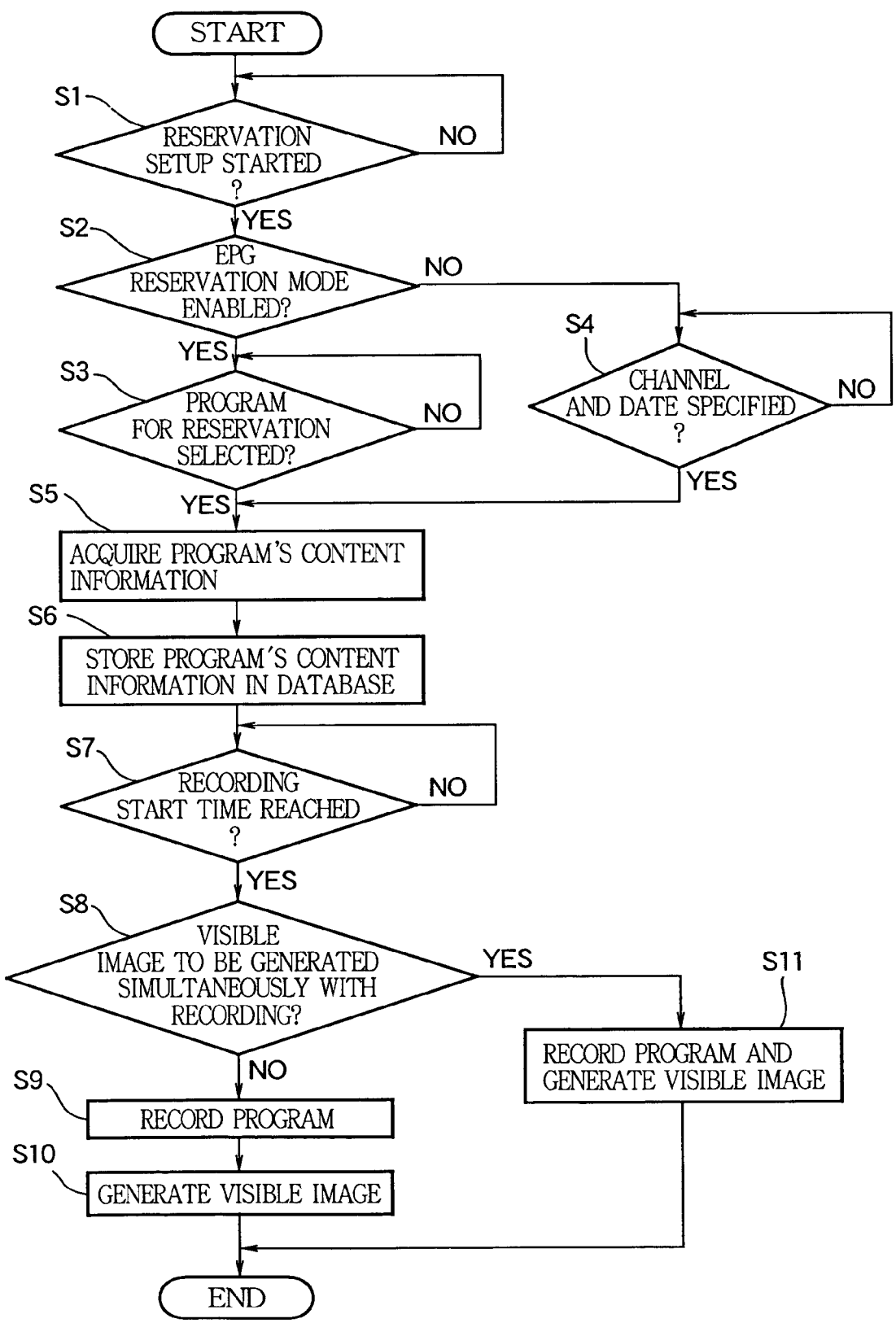
FIG. 4 is a flowchart showing operations of simultaneously or continuously recording a program and a visible image on the DVD recorder.

The DVD recorder 1 performs the following processes when simultaneously or continuously recording programs and visible images. FIG. 4 is a flowchart showing operations of simultaneously or continuously recording a program and a visible image on the DVD recorder. The operation section 24 or the remote controller 27 is operated to start the reservation (s1). The main control section 25 of the DVD recorder 1 confirms the reservation mode. Let us consider that the user displays the EPG on the monitor and selects the EPG reservation mode (s2). The operation section 24 or the remote controller 27 is operated to set a program reserved for recording, generation of a visible image displaying the program's content information, and timing to generate the visible image (s3). The main control section 25 acquires the EPG data transmitted together with the broadcast wave or the content information about the program reserved for recording from the program information providing site (s5). The main control section 25 stores the content information about the program reserved for recording in the EPG database 20 (s6) and waits until the recording start time (s7).

On the other hand, let us consider that the manual reservation mode is selected at step s2. The main control section 25 sets a channel for the program to be recorded and a recording date including the start time and the end time (s4), and then performs the process at step s5 and later.

When configured to generate a visible image simultaneously with recording, the DVD recorder 1 calculates a DVD's unused area based on the recording time of the program reserved for recording. That is to say, the DVD recorder 1 calculates the start position of the recording area for the visible image and adjusts the visible image size according to the unused area size.

When the recording start time is reached (s7), the DVD recorder 1 starts recording. At this time, let us consider that the visible image is scheduled to be recorded after the recording (s8). The main control section 25 records the program (s9). Upon completion of the recording, the main control section 25 allows the EPG data selection section 19 to select the program's content information from the EPG database 20. The main control section 25 allows the recording/reproducing section 22 to generate the visible image for displaying the content information of the recorded program (s10). The user can predetermine to vary the visible image size in accordance with the unused area size or to use the same visible image size independently of the unused area size. The main control section 25 terminates the process when the visible image generation terminates.

At step s8, the program recording may be configured to occur simultaneously with the visible image generation. While recording the program, the main control section 25 generates the visible image indicating the content information about the program on an area to be used as the unused area (s11) during the broadcast of such information as commercials not intended for recording. When the DVD recorder 1 uses two optical pickups, the main control section 25 performs recording of the program data simultaneously with generation of the visible image indicating the program's content information. The main control section 25 terminates the process when completing the program data recording and the generation of the visible image indicating the program's content information.

Figure 5:
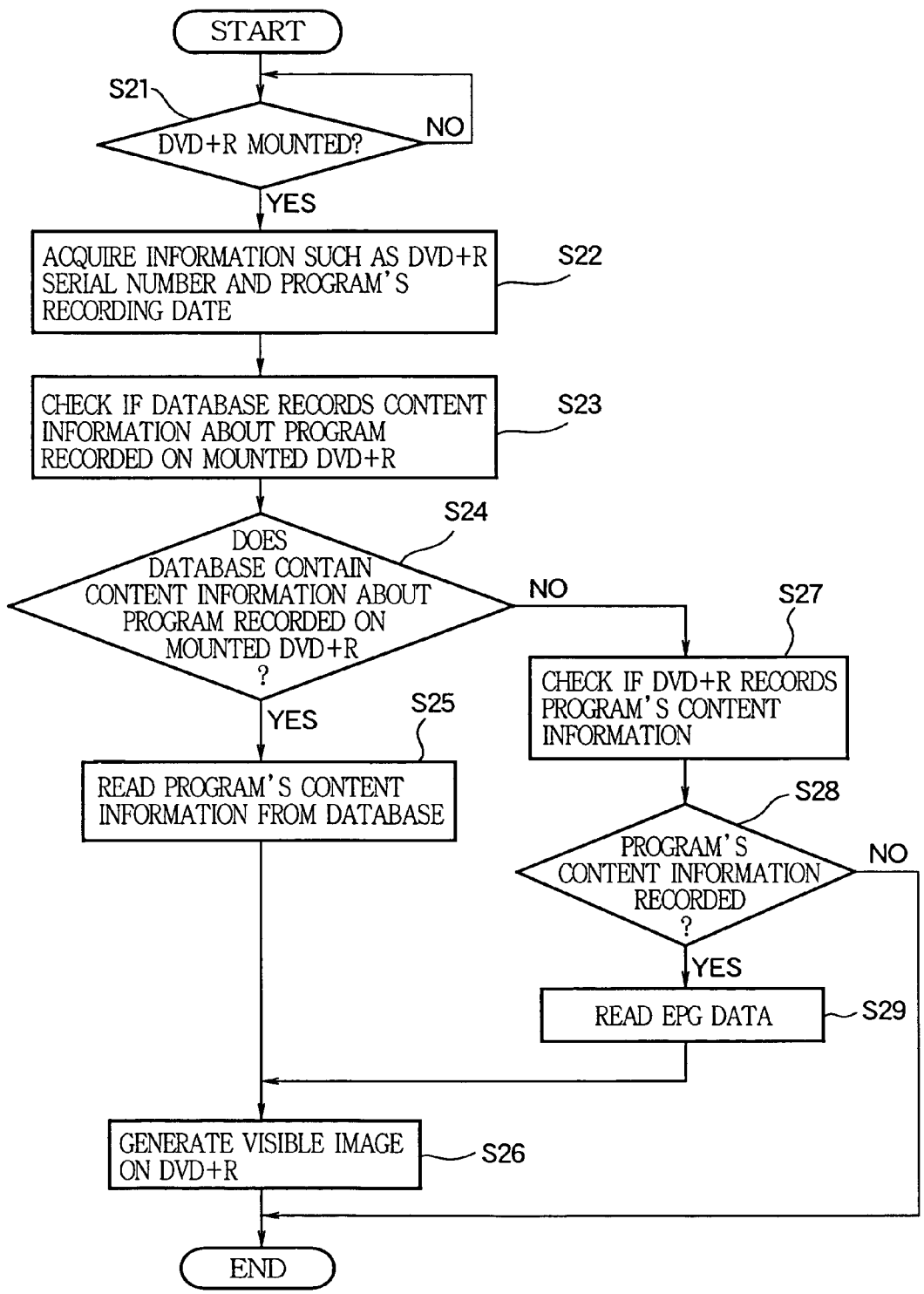
FIG. 5 is a flowchart showing operations of the DVD recorder to record a visible image on a DVD+R.

The following describes recording a visible image on a recorded DVD. FIG. 5 is a flowchart showing operations of the DVD recorder to record a visible image on a recorded DVD+R. When recording a program on the DVD+R 5, the DVD recorder 1 already stores the program's content information in the EPG database 20 as mentioned above. This is advantageous if the user forgets to generate a visible image for the program's content information when using the DVD recorder 1 to record the program on the DVD+R 5. Even after the recording, the user can record the program's content information on the recorded DVD+R 5.

The recorded DVD+R is mounted (s21). The main control section 25 of the DVD recorder 1 allows the recording/reproducing section 22 to read such information as the recording date (timestamp) of the program recorded on the DVD+R 5 and a serial number of the DVD+R 5 and acquire these information (s22). The main control section 25 then determines whether or not the EPG database 20 records the content information corresponding to the timestamp of the program recorded on the DVD+R 5 or the content information associated with the serial number of the DVD+R 5 (s23). Let us consider that the EPG database 20 records the content information of the program recorded on the DVD+R 5 (s24). Based on an instruction from the main control section 25, the EPG data selection section 19 reads the content information of the program recorded on the DVD+R 5 from the EPG database 20 and outputs the information to the recording/ reproducing section 22 (s25). Based on an instruction from the main control section 25, the recording/reproducing section 22 generates a visible image indicating the program's content information on the unused area of the DVD+R 5 (s26). The main control section 25 terminates the process when the recording/reproducing section 22 terminates the visible image generation.

At step s24, the EPG database 20 may not record such information as the content information of the program recorded on the DVD+R 5 or the serial number of the DVD+R 5. The main control section 25 allows the recording/reproducing section 22 to read data from the DVD+R 5 and determines whether or not the DVD+R 5 records the program's content information (s27). The main control section 25 terminates the process if the DVD+R 5 does not record the program's content information (s28). If the DVD+R 5 records the program's content information, the recording/reproducing section 22 reads the program's content information from the DVD+R 5 and outputs it to the EPG data filter 18. When the EPG data filter 18 outputs the program's content information, the EPG data selection section 19 outputs this information to the recording/reproducing section 22. The recording/reproducing section 22 generates the visible image indicating the program's content information output from the EPG data selection section 19 on the DVD+R 5 (s29). The main control section 25 terminates the process when the recording/reproducing section 22 terminates the visible image generation.

In this manner, the recorded DVD+R can record the recorded program's content information or the electronic program guide containing the information. This makes it possible to generate a visible image indicating the content information about the program recorded on a DVD+R if already recorded by a different optical disk apparatus.

Figure 6:
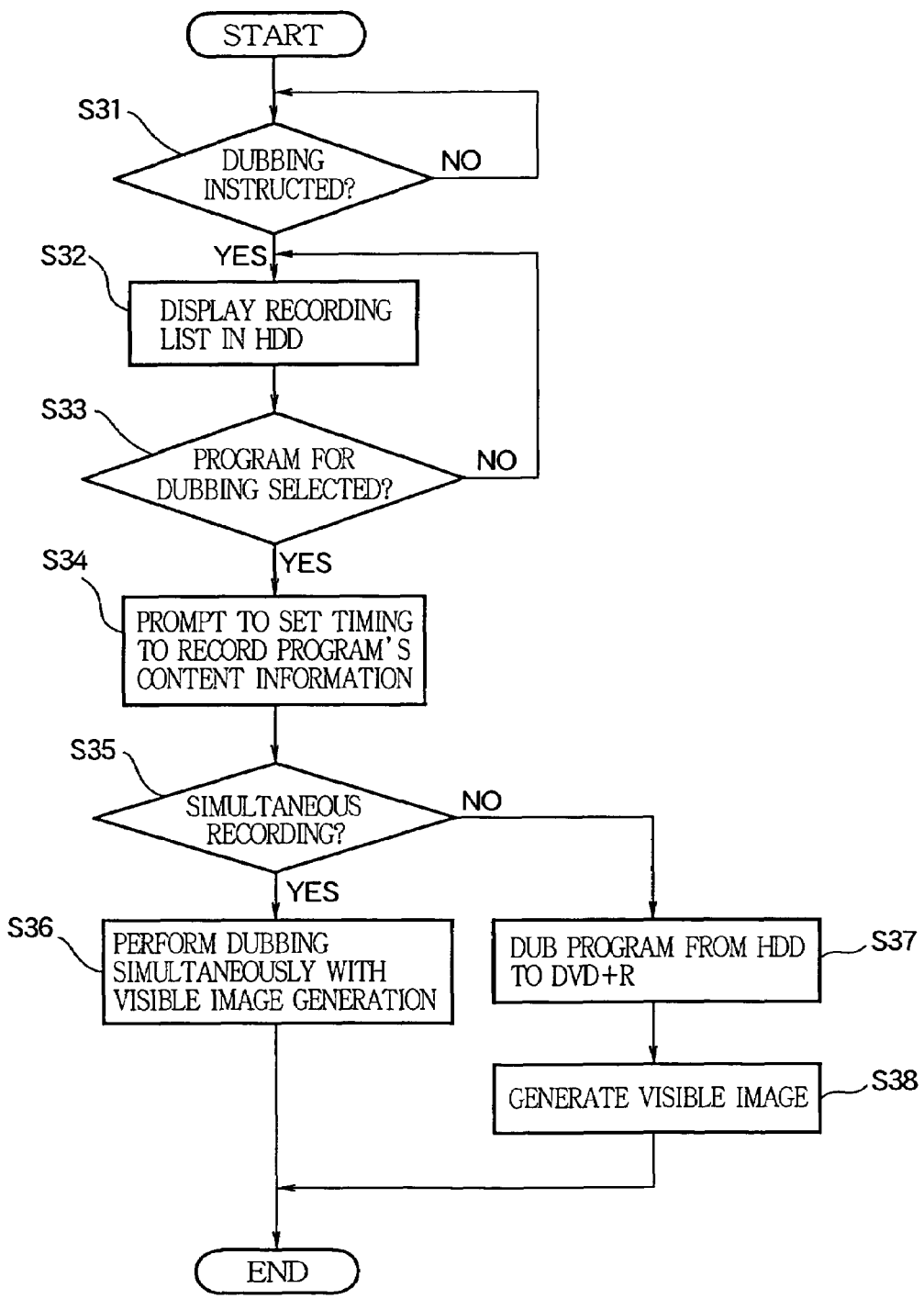
FIG. 6 is a flowchart showing operations of reserving a program for recording on the HDD of the DVD recorder and dubbing the recorded program to the DVD+R.

The following describes dubbing data recorded on the HDD 23 in the DVD recorder 1 to a DVD. FIG. 6 is the flowchart showing operations of reserving a program for recording on the HDD of the DVD recorder and dubbing the recorded program to the DVD+R. The description with reference to FIG. 6 assumes that the DVD recorder 1 is configured to use two optical pickups 30. It is assumed that the DVD recorder 1 is set to reserve a program for recording and records the program on the HDD 23 according to a process similar to that described with reference to FIG. 4. It is also assumed that the DVD recorder 1 acquires the content information about the reserved program and records the information in the EPG database 20.

The user uses the operation section 24 to specify dubbing program data recorded on the HDD 23 to the DVD+R 5 (s31). The main control section 25 of the DVD recorder 1 allows the monitor 2 to display a data list recorded in the HDD 23 (s32). Let us consider a case of selecting program data to be dubbed to the DVD+R 5 (s33). The main control section 25 allows the monitor 2 to display an indication prompting the user to select whether to simultaneously or continuously record the program data to be dubbed and a visible image indicating the program's content information (s34).

The user may use the operation section 24 to specify program data recording (dubbing) simultaneously with visible image recording (s35). The main control section 25 outputs the program data to the recording/reproducing section 22 from the HDD 23 and allows the DVD+R 5 to record the data for dubbing using one of the optical pickups provided for the recording/reproducing section 22. The main control section 25 allows the EPG data selection section 19 to read the program's content information from the EPG database 20 and output the information to the recording/reproducing section 22. The recording/reproducing section 22 creates a visible image indicating the program's content information in an area to be used as the unused area (s36). The main control section 25 terminates the process when the program reserved for recording ends.

On the other hand, the user may specify recording the visible image after recording (dubbing) the program data (s35). The main control section 25 allows the HDD 23 to output the program data to the recording/reproducing section 22 and allows the DVD+R 5 to record the program data (s37). When completing the program data recording, the DVD recorder 1 records the visible image indicating the program's content information in the unused area (s38). The DVD recorder 1 terminates the process upon completion of the visible image recording.

As mentioned above, the optical disk recording apparatus according to the present invention can record a program on an optical disk and generate a visible image indicating the content information about the recorded program on the optical disk's label face. Accordingly, the user can easily identify the optical disk that records the program intended for reproduction.

In the above-mentioned description, the recording/reproducing section 22 generates the visible image indicating the content information about the program recorded on the DVD+R 5. Further, the DVD recorder 1 can allow the label writer 21 to record the program's content information on the label face of the DVD+R 5 before or immediately after the recording/reproducing section 22 records the program data on the data recording face of the DVD+R 5. Instead of the label writer 21, the recording/reproducing section 22 may be provided to use the DVD+R 5 having the label face coated with such material as a pigment that develops color due to the laser light's heat. In this case, it is possible to print the program's content information on the label face while recording the program data on the data recording face. Also in this case, the data recording face of the DVD+R 5 can be used to generate the visible image indicating the program's content information. When the label writer 21 is unavailable, the medium is reversed, and the data-recording optical pickup can be used to print (generate) a visible image indicating the program's content information on the label. Accordingly, both sides of the DVD+R 5 can display the content information about the program recorded on the DVD+R 5. The user can more easily identify what is recorded on the DVD+R 5. When the program's content information is displayed on the DVD+R 5 as mentioned above, it is possible to prevent problems of unbalancing the optical disk and peeling the label off the DVD+R 5. The user can reproduce the DVD+R 5 without worrying about these problems.

What is claimed is:

1. An apparatus for recording a broadcast program on an optical disk, comprising:
    a broadcast reception section that receives a broadcast signal containing programs broadcasted from a broadcast station;
    a recording setup section that specifies a program to be recorded on an optical disk, contained in the received broadcast signal;
    an information acquisition section that acquires attribute information associated to and serving to identify content of the specified program from an electronic program guide of the broadcasted programs, the electronic program guide being contained in the broadcast signal or being available from another source separate of the broadcast signal; and
    a recording/reproducing section that is operated to record the content of the specified program by forming a pattern of marks and spaces on a data recording face of the optical disk with an optical process of irradiating an optical beam onto the data recording face, and that is operated to form a visible image of the attribute information of the recorded content with the optical process on other area of the data recording face than the area where the content is recorded or on a label face reverse to the data recording face of the optical disk.

2. The apparatus according to claim 1, further comprising a storage section that stores the attribute information acquired by the information acquisition section, wherein the recording/reproducing section records the content of the specified program, then reads the attribute information of the recorded content from the storage section, and forms the visible image of the read attribute information on the data recording face of the optical disk or the label face reverse to the data recording face.

3. The apparatus according to claim 1, wherein the information acquisition section operates when an optical disk is loaded which is recorded with the content of the program together with the electronic program guide for activating the reproducing/recording section to reproduce the electronic program guide from the loaded optical disk and acquiring the attribute information of the content of the program recorded on the optical disk from the electronic program guide reproduced by the recording/reproducing section, and wherein the recording/reproducing section forms the visible image of the attribute information of the content recorded on the optical disk based on the attribute information acquired by the information acquisition section.

4. The apparatus according to claim 1, wherein the information acquisition section acquires the attribute information of the content of the specified program from the electronic program guide which is downloaded from a site providing the electronic program guide on Internet.

5. The apparatus according to claim 1, wherein the information acquisition section acquires the attribute information of the content of the program in the form of character information or image information, the character information including at least one of a title of the program, a broadcast date of the program, a broadcast start time of the program, a broadcast end time of the program, a summary of the content of the program, and a genre of the content of the program, the image information including at least one of a logo of the program, a thumbnail to show a scene of the content of the program.

6. A method of recording a broadcast program on an optical disk by means of an optical recording apparatus, comprising the steps of:

receiving a broadcast signal containing various programs broadcasted from a broadcast station;
specifying a program to be recorded on an optical disk among the various programs contained in the received broadcast signal;
acquiring attribute information associative of content of the specified program from an electronic program guide of various programs, the electronic program guide being contained in the broadcast signal or being available from another source separate of the broadcast signal;
operating the optical recording apparatus to record the content of the specified program by forming a pattern of marks and spaces on a data recording face of the optical disk with an optical process of irradiating an optical beam onto the data recording face; and
operating the optical recording apparatus to form a visible image of the attribute information of the recorded content with the optical process on other area of the data recording face than the area where the content is recorded or on a label face reverse to the data recording face of the optical disk.

7. A computer-readable medium containing a computer program executable by a computer for performing a method of recording a broadcast program on an optical disk by means of an optical disk drive, wherein the method comprising the steps of:

receiving a broadcast signal containing various programs broadcasted from a broadcast station;
specifying a program to be recorded on an optical disk among the various programs contained in the received broadcast signal;
acquiring attribute information associative of content of the specified program from an electronic program guide of various programs, the electronic program guide being contained in the broadcast signal or being available from another source separate of the broadcast signal;
operating the optical disk drive to record the content of the specified program by forming a pattern of marks and spaces on a data recording face of the optical disk with an optical process of irradiating an optical beam onto the data recording face; and
operating the optical disk drive to form a visible image of the attribute information of the recorded content with the optical process on other area of the data recording face than the area where the content is recorded or on a label face reverse to the data recording face of the optical disk.

* * * * *